(12) United States Patent
Kobayashi et al.

(10) Patent No.: US 7,088,021 B2
(45) Date of Patent: Aug. 8, 2006

(54) ELECTRIC MOTOR STRUCTURE

(75) Inventors: Masakazu Kobayashi, Yokosuka (JP); Tomiyuki Segawa, Yokosuka (JP); Yuki Nakajima, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/028,228

(22) Filed: Jan. 4, 2005

(65) Prior Publication Data

US 2005/0156471 A1 Jul. 21, 2005

(30) Foreign Application Priority Data

Jan. 9, 2004 (JP) ............................. 2004-003789

(51) Int. Cl.
*H02K 9/00* (2006.01)

(52) U.S. Cl. .......................... 310/52; 310/61; 310/261

(58) Field of Classification Search ............ 310/52–59, 310/60 R, 61–63, 60 A, 216, 261
See application file for complete search history.

(56) References Cited

U.S. PATENT DOCUMENTS 3,629,634 A * 12/1971 Dafler et al. ................ 310/94
4,306,165 A * 12/1981 Kitabayashi et al. .......... 310/59
4,311,931 A * 1/1982 Fujioka et al. ................ 310/55
6,700,283 B1 3/2004 Kikuchi et al.
2003/0132673 A1 7/2003 Zhou et al.

FOREIGN PATENT DOCUMENTS

JP 2003-219607 A 7/2003

* cited by examiner

*Primary Examiner*—Thanh Lam
(74) *Attorney, Agent, or Firm*—Shinjyu Global IP Counselors (57) ABSTRACT

An electric motor structure includes a rotary shaft with a coolant passageway therein and a rotor with a cooling surface non-rotatably coupled to the rotary shaft. The coolant is supplied from the coolant passageway of the rotary shaft to the cooling surface of the rotor and flows along the cooling surface of the rotor as a liquid film. The electric motor structure is further provided with a coolant discharge restricting section configured and arranged to restrict discharging of the coolant from the cooling surface. The coolant discharge restricting section protrudes from the cooling surface in a direction substantially perpendicular to the cooling surface where the coolant flown along the cooling surface is discharged from the cooling surface. Thus, a high cooling performance is obtained even when the rotor rotates at high rotational speeds by maintaining a sufficient liquid film thickness.

22 Claims, 10 Drawing Sheets

ELECTRIC MOTOR STRUCTURE

BACKGROUND OF THE INVENTION

1. Field of the Invention

The present invention generally relates to an electric motor structure that is provided with a rotor cooling structure. More specifically, the present invention relates to an electric motor structure with a rotor cooling structure utilized in both a radial gap electric motor in which a stator and a rotor are arranged to face each other in a radial direction with respect to a rotary shaft, and an axial gap electric motor in which a stator and a disk rotor are arranged along a rotary shaft to face each other in an axial direction with respect to the rotary shaft.

2. Background Information

Some conventional electric motors are equipped with a rotor cooling structure in which a rotor of the electric motor is cooled by a coolant. For example, Japanese Laid-Open Patent Publication No. 2003-219607 discloses a rotor cooling structure for a radial gap electric motor. In this publication, a tubular shape stator and a tubular shape rotor are coaxially arranged with respect to a rotary shaft so as to face each other across a radial gap formed between the stator and the rotor. In this publication, a rotor cooling structure is provided for the radial gap electric motor in which a cone-shaped interstitial coolant passage is formed between the rotor and a rotary shaft in an axial direction of the rotary shaft. The interstitial coolant passage is configured such that an external diameter of the interstitial coolant passage increases as it approaches a coolant outlet from a coolant inlet. Thus, the coolant introduced into the interstitial coolant passage flows from the coolant inlet to the coolant outlet to cool the rotor due to the centrifugal force of the rotor.

Moreover, a rotor cooling structure for an axial gap electric motor in which a stator and a disk rotor are arranged along a rotary shaft such that the stator and the rotor face each other across an axial gap formed between the stator and the rotor has also been proposed. In such rotor cooling structure for an axial gap electric motor, the rotor is provided with a recessed cooling surface portion and a coolant is supplied to the cooling surface portion via a communication passageway formed in the rotary shaft. The centrifugal force of the rotor is utilized to make the coolant flow from radially inward direction to radially outward direction along the cooling surface portion, thereby cooling the rotor.

In both conventional rotor cooling structures for the radial gap electric motor and the axial gap electric motor mentioned above, the coolant is forced against the cooling surface of the rotor by the centrifugal force of the rotor such that a liquid film of the coolant having a prescribed thickness flows across the cooling surface. Thus, the rotor can be cooled with a high level of cooling performance.

In view of the above, it will be apparent to those skilled in the art from this disclosure that there exists a need for an improved electric motor structure. This invention addresses this need in the art as well as other needs, which will become apparent to those skilled in the art from this disclosure.

SUMMARY OF THE INVENTION

It has been discovered that, with the conventional rotor cooling structures described above, the cooling performance declines when the electric motor rotates at high speeds. When the electric motor rotates at high speeds, the centrifugal force of the rotor becomes large and the amount of coolant discharged from the cooling surface increases. Thus, the liquid film of the coolant flowing over the cooling surface of the rotor becomes extremely thin. As a result, the liquid coolant film brakes up and the flow of the coolant becomes unstable. In such case, the cooling performance declines. Moreover, when the liquid film thickness decreases, a heat transfer coefficient decreases and the cooling performance declines. This trend becomes more remarkable as the rotational speed of the rotor increases. However, if the amount of coolant supplied to the cooling surface of the rotor is increased in order to secure a sufficient film thickness, the rotor will experience an increase in mechanical power loss.

Accordingly, one object of the present invention is to provide an electric motor structure having a rotor cooling structure configured and arranged to maintain a sufficient liquid film thickness without increasing the mechanical power loss of the rotor to secure a high cooling performance even when the rotor rotates at high rotational speeds.

In order to achieve the above mentioned and other objects of the present invention, an electric motor structure is provided that comprises a rotary shaft, a rotor and a coolant discharge restricting section. The rotary shaft has a coolant passageway therein. The rotor is coupled to the rotary shaft, and has a cooling surface configured and arranged to receive a coolant supplied from the coolant passageway of the rotary shaft such that the coolant flows along the cooling surface. The coolant discharge restricting section is formed on the cooling surface of the rotor and configured and arranged to restrict discharge of the coolant from the cooling surface.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
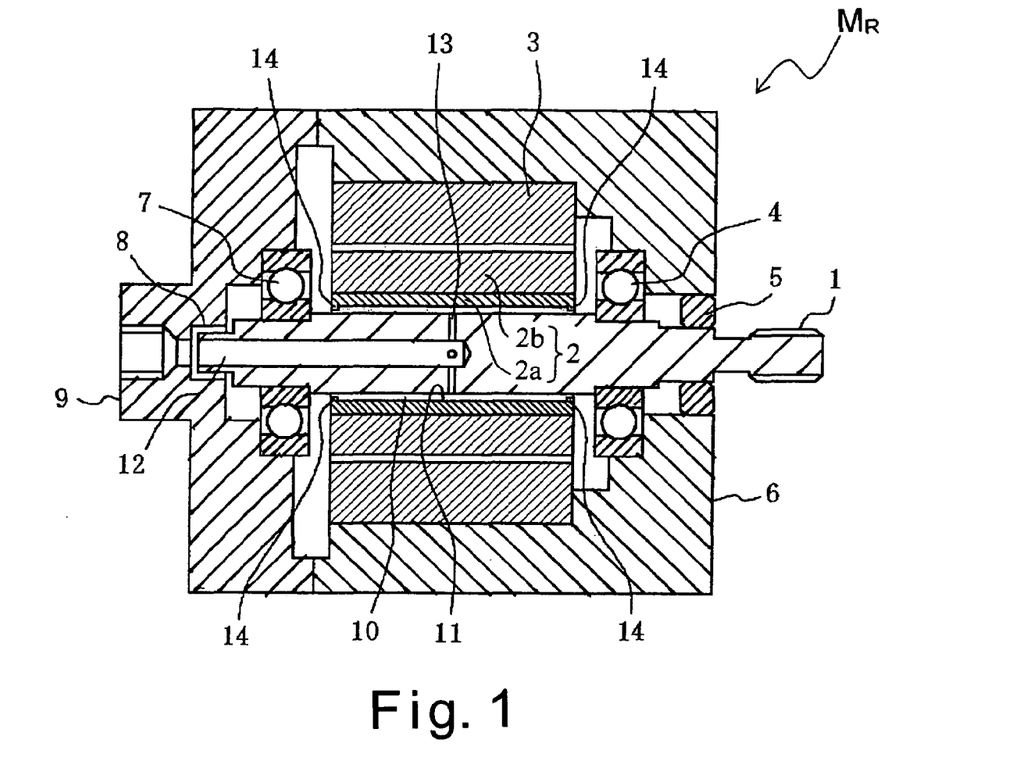
FIG. 1 is a simplified schematic cross sectional view of a radial gap electric motor with an electric motor structure in accordance with a first embodiment of the present invention.

FIG. 1 is a schematic partial cross sectional view of a radial gap electric motor $M_R$ in which an electric motor structure in accordance with a first embodiment of the present invention is provided.

As seen in FIG. 1, the radial gap electric motor $M_R$ comprises a rotary shaft 1, a rotor 2 and stator 3. The rotor 2 is fixedly coupled to the rotary shaft 1 so that they rotate together. The rotor 2 and the stator 3 preferably have generally tubular shapes arranged coaxially with respect to the rotary shaft 1 with the stator 3 being arranged around the outside of the rotor 2. Moreover, a front case 6 is coupled to the outside of the stator 3 and configured and arranged to support one end of the rotary shaft 1 through a bearing 4 and a seal 5 while a cover 9 is coupled to the front case 6 and configured and arranged to support the other end of the rotary shaft 1 through a bearing 7 and a seal 8.

The stator 3 is preferably configured and arranged as a conventional stator with a stator cooling structure. For example, the stator 3 is preferably configured and arranged as a stator described in U.S. Pat. No. 6,700,284. With the structure of the stator disclosed in this reference, the stator 3 is provided with cooling passages formed therein to obtain a high cooling efficiency. Of course, it will be apparent to those skilled in the art from this disclosure that the structure of the stator 3 is not limited to the one disclosed in the U.S. Pat. No. 6,700,284. Rather, any other stator structure can be utilized as the stator 3 as long as the stator structure is compatible with the radial gap electric motor $M_R$ as shown in FIG. 1.

The rotor 2 preferably comprises a center cylindrical member 2a and a rotor body member 2b as seen in FIG. 1. The center cylindrical member 2a of the rotor 2 is preferably configured and arranged to be non-rotatably coupled to the rotary shaft 1 to form an interstitial coolant passage 10 therebetween. The rotor body member 2b is preferably formed in a conventional manner with a plurality of plate members that are stack together in an axial direction of the rotor 2. The rotor body member 2b of the rotor 2 is preferably formed in a conventional manner with a plurality of plates stacked in an axial direction of the rotor 2. In FIG. 1, the rotor body member 2b is illustrated as a one-piece member for the sake of simplicity. Also, although the center cylindrical member 2a and the rotor body member 2b of the rotor 2 are illustrated as separate members, it will be apparent to those skilled in the art from this disclosure that the center cylindrical member 2a and the rotor body member 2b can be formed as a one-piece, unitary member if so desired.

Figure 2:
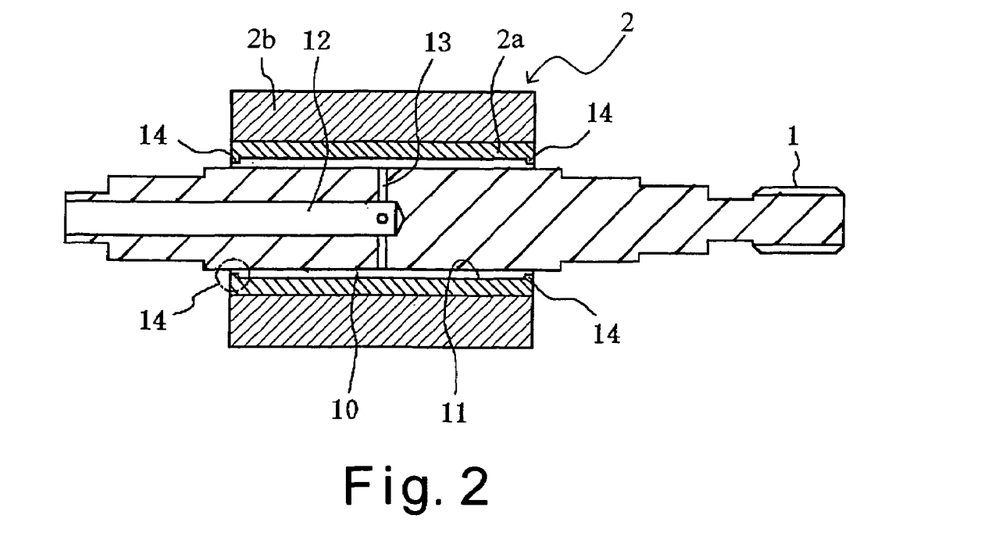
FIG. 2 is an enlarged partial schematic cross sectional view of a rotor and a rotary shaft of the radial gap electric motor illustrated in FIG. 1 in accordance with the first embodiment of the present invention.

As seen in FIG. 2, the center cylindrical member 2a of the rotor 2 includes an inner peripheral surface or cooling surface 11 that faces a radial outer peripheral surface of the rotary shaft 1 such that the interstitial coolant passage 10 is formed between the cooling surface 11 and the radial outer peripheral surface of the rotary shaft 1. The rotary shaft 1 includes an axial coolant passage 12 therein. The axial coolant passage 12 extends along an center axis of the rotary shaft 1 from a first end of the rotary shaft 1 located near the bearing 7 to a position located slightly beyond an approximate middle position of the rotary shaft 1 toward a second end of the rotary shaft 1 located near the bearing 4. One or more coolant supply passages 13 are provided in the rotary shaft 1 that communicate between the interstitial coolant passage 10 and the axial coolant passage 12 as seen in FIG. 1. Thus, a coolant is supplied from the axial coolant passage 12 of the rotary shaft 1 to the interstitial coolant passage 10 via the coolant supply passages 13. Thus, the coolant supplied to the interstitial coolant passage 10 from the axial coolant passage 12 through the coolant supply passages 13 flows along the cooling surface 11 from an approximate center portion of the rotor 2 toward both the axial ends of the rotor 2 and forms the liquid film on the cooling surface 11 due to the centrifugal force generated by rotation of the rotor 2. The axial coolant passage 12 and the coolant supply passages 13 together form a coolant passageway of the rotary shaft 1.

FIG. 2 is an enlarged schematic partial cross sectional view of the rotor 2 and the rotary shaft 1 of the radial gap electric motor $M_R$ shown in FIG. 1. As seen in FIGS. 1 and 2, the center cylindrical member 2a of the rotor 2 is configured and arranged such that an internal diameter thereof (i.e., an internal diameter of the cooling surface 11) is reduced at both ends of the center cylindrical member 2a where the coolant is discharged from the interstitial coolant passage 10 by providing a pair of small or reduced diameter sections 14. In other words, the reduced diameter sections 14 are configured and arranged as a pair of annular flanges formed at both ends of the cooling surface 11 that are separated from each other along the axial direction of the rotary shaft 1. Since both ends of the cooling surface 11 where the coolant is discharged from the interstitial coolant passage 10 are provided with the reduced diameter sections 14, the coolant flowing as a liquid film on the cooling surface 11 is held by the reduced diameter sections 14 as if blocked by a dam. Accordingly, by providing the reduced diameter sections 14 on the cooling surface 1, the amount of coolant discharged from the cooling surface 11 of the rotor 2 can be restricted or limited. Thus, in the first embodiment of the present invention, the reduced diameter sections 14 form a coolant discharge restricting section.

Thus, with the present invention, when the coolant supplied to the interstitial coolant passage 10 flows along the cooling surface 11 from an approximate center portion of the rotor 2 toward both the axial ends of the rotor 2 to form the liquid film on the cooling surface 11 an amount of coolant that is sufficient to obtain a desired film thickness and to ensure a high cooling performance is maintained on the cooling surface 11 even when the rotational speed of the rotor 2 is high and the centrifugal force acting on the liquid film on the cooling surface 11 is large. As a result, it is not necessary to increase the amount of coolant supplied to the cooling surface 11 in order to secure a sufficient coolant film thickness, and thus, the mechanical power loss of the rotor 2 can be prevented from increasing.

Figure 3:
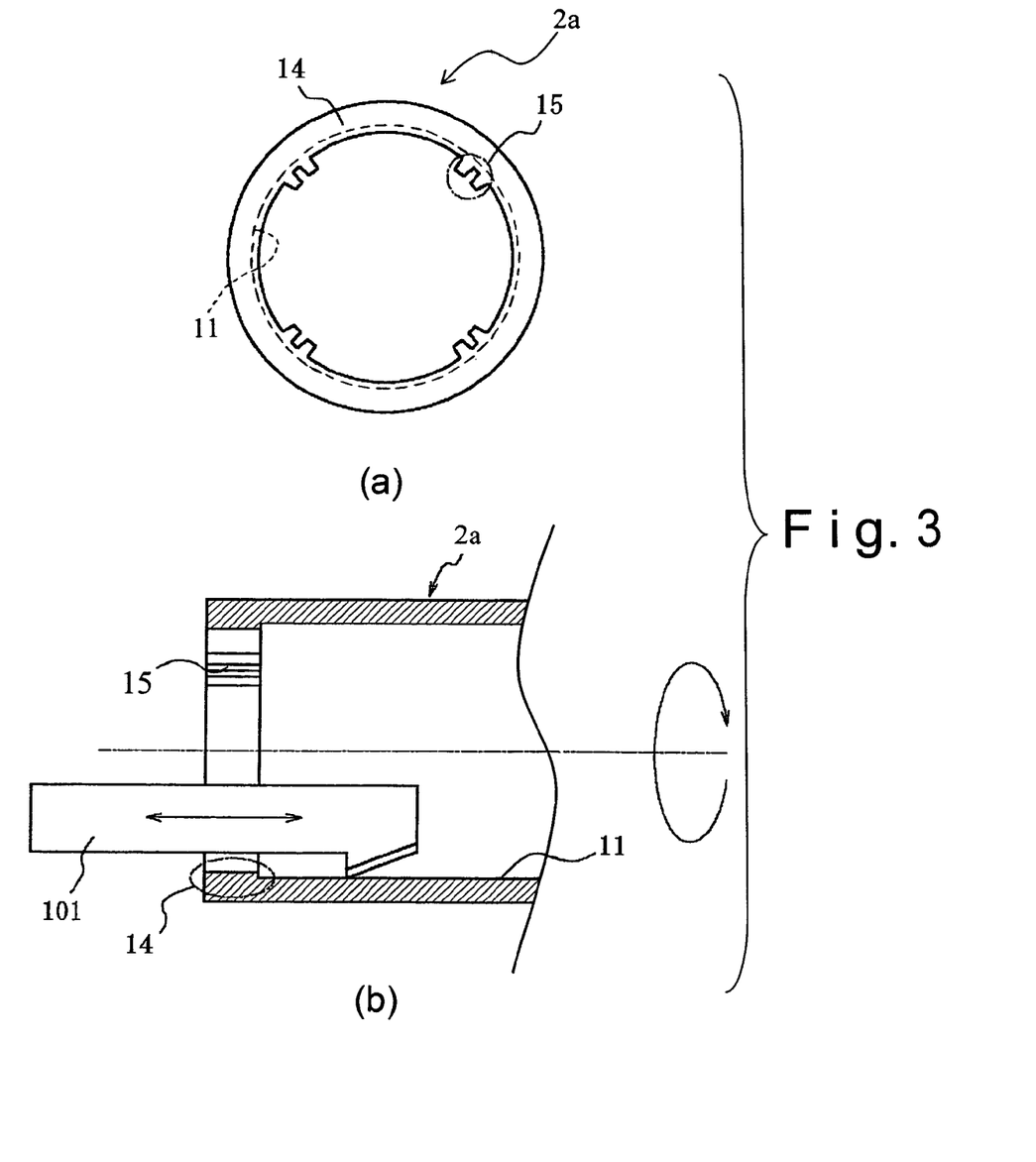
FIG. 3 is a series of diagrams for illustrating a configuration of rotary shaft mating sections and reduced diameter sections provided with the rotor, and for illustrating a method of forming the rotary shaft mating sections and the reduced diameter sections of the rotor illustrated in FIGS. 1 and 2 in accordance with the first embodiment of the present invention.

FIG. 3 shows a series of schematic diagrams illustrating one configuration of the center cylindrical member 2a of the rotor 2. More specifically, a diagram (a) of FIG. 3 is an axial end view of the center cylindrical member 2a of the rotor 2 as seen from the left side of FIG. 2 for illustrating a plurality of rotary shaft mating sections 15 formed on the reduced diameter section 14. The rotary shaft mating sections 15 are configured and arranged to mate with four ribs (not shown) of the rotary shaft 1 to non-rotatably couple the rotor 2 with the rotary shaft 1. A diagram (b) of FIG. 3 is a diagrammatic cross sectional view of the center cylindrical member 2a of the rotor 2 during the manufacturing thereof with a machining tool 101 taken along a center axis of the rotor 2. In the diagram (b) of FIG. 3, a center axis of the rotor 2 is shown with a dash line.

In manufacturing the center cylindrical member 2a of the rotor 2, the rotary shaft mating sections 15 each preferably comprising two strip-like protrusions that extend parallel to the center axis of the rotor 2 are first provided in four locations around a circumference of a circular cylindrical member (the center cylindrical member 2a) at both axial end portions (only the left side axial end portion is shown in the diagrams (a) and (b) of FIG. 3) of the circular cylindrical member using broaching or other machining or manufacturing methods. Then, an internal surface of the cylindrical member is machined using an L-shaped machining tool 101 as shown in the diagram (b) of FIG. 3 to form the cooling surface 11 of the center cylindrical member 2a. As shown in the diagram (b) of FIG. 3, the axial end portions (only the left side axial end portion is shown) where the rotary shaft mating sections 15 are formed are left without being machined by the L-shaped machining tool 101 to form the reduced diameter sections 14. As a result, the center cylindrical member 2a of the rotor 2 as shown in FIGS. 1 and 2 is formed.

Figure 4:
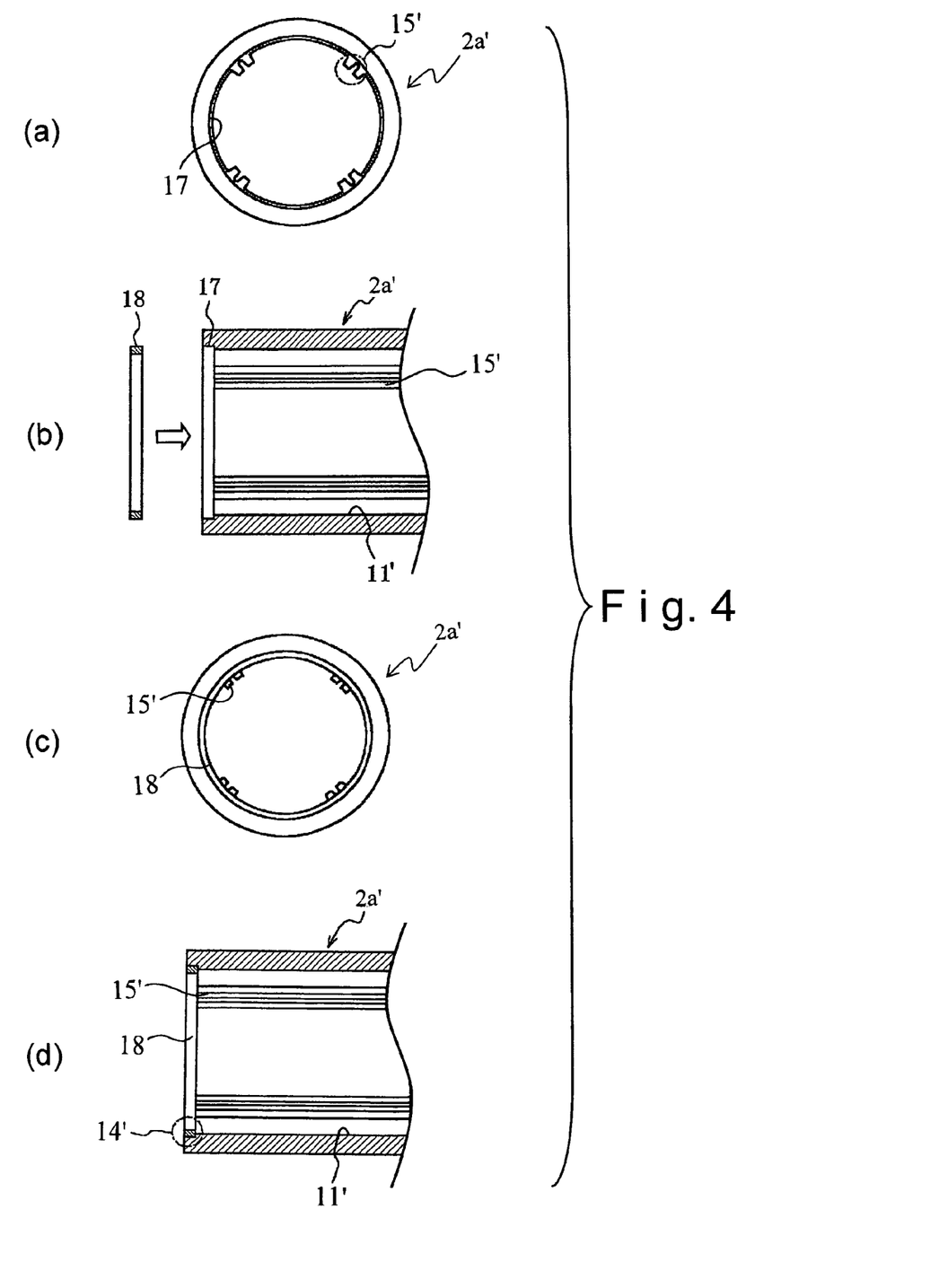
FIG. 4 is a series of diagrams illustrating an alternative configuration of the rotary shaft mating sections and the reduced diameter sections, and a method of forming the rotary shaft mating sections and the reduced diameter sections of the rotor illustrated in FIGS. 1 and 2 in accordance with the first embodiment of the present invention.

Alternatively, the center cylindrical member 2a of the rotor 2 in FIGS. 1 and 2 can be substituted with a center cylindrical member 2a' shown in diagrams (a) to (d) of FIG. 4. More specifically, the center cylindrical member 2a' is basically identical to the center cylindrical member 2a shown in FIG. 3 except for a configuration of rotary shaft mating sections 15' for coupling the center cylindrical member 2a' and the rotary shaft 1 and a method of forming the reduced diameter sections 14'.

The diagrams (a) to (d) of FIG. 4 illustrate a manufacturing process of the center cylindrical member 2a'. More specifically, the diagram (a) of FIG. 4 is a schematic axial end view of the center cylindrical member rotor 2a' that substantially corresponds to the diagram (a) of FIG. 3. The diagram (b) of FIG. 4 is a partial cross sectional view taken along a center axis of the center cylindrical member 2a' before a ring member 18 is installed to form the reduced diameter section 14'. The diagram (c) of FIG. 4 is a schematic axial end view of the center cylindrical member 2a' after the ring member 18 is installed. The diagram (d) of FIG. 4 is a partial cross sectional view taken along the center axis of the center cylindrical member 2a'.

As seen in the diagram (a) of FIG. 4, in the center cylindrical member 2a', the rotary shaft mating sections 15' are provided in four locations around a circumference of a circular cylindrical member (the center cylindrical member 2a') using broaching or other manufacturing methods. Each of the rotary shaft mating sections 15' comprises a two strip-like protrusion that extends parallel to the center axis of the rotor 2' and extends over an entire axial length of the center cylindrical member 2a'. Then, internal surfaces of both axial ends of the center cylindrical member 2a' (only the left side axial end portion of the center cylindrical member 2a' is shown) are machined as shown in the diagram (b) of FIG. 4 to form a pair of large diameter sections 17 (only the large diameter section 17 disposed at the left axial end portion of the center cylindrical member 2a' is shown). Then, the rotary shaft 1 (not shown in the diagrams (a) to (d) of FIG. 4) is fitted into the rotor 2' such that the rotary shaft 1 mates with the rotary shaft mating sections 15'. Finally, the rings members 18 (only one on the left side axial end of the center cylindrical member 2a' is shown) are fitted into the large diameter sections 17 to form the reduced diameter sections 14' at both axial end portions of the center cylindrical member 2a'.

Although two configurations of the center cylindrical members 2a and 2a' with different methods of forming the reduced diameter sections 14 and 14' are presented here, it will be apparent to those skilled in the art from this disclosure that the present invention is not limited to these configurations of the center cylindrical members 2a and 2a'. In other words, any configuration and method of manufacturing the center cylindrical member 2a is accepted as long as the center cylindrical member 2a is configured and arranged to be non-rotatably coupled to the rotary shaft 1 and provided with the reduced diameter sections 14 at the axial ends of the center cylindrical member 2a as shown in FIGS. 1 and 2.

Accordingly, with the radial gap electric motor $M_R$ provided with the rotor cooling structure of the first embodiment, the reduced diameter sections 14 are configured and arranged to hold the coolant on the cooling surface 11 of the center cylindrical member 2a of the rotor 2 like a dam. In other words, the reduced diameter sections 14 are configured and arranged to limit the amount of coolant discharged from the cooling surface 11 and the interstitial coolant passage 10. Thus, even when the rotor 2 rotates at a high speed and the centrifugal force acting on the liquid film of the coolant on the cooling surface 11 is large, a certain amount of coolant on the cooling surface 11 is secured to maintain a thickness of the liquid film of the coolant at a desired thickness. Thus, a high cooling performance of the rotor 2 can be ensured. As a result, it is not necessary to increase the amount of coolant being supplied to the cooling surface 11 in order to secure a sufficient coolant film thickness when the rotor 2 is rotating at high rotational speeds, and thus, the mechanical power loss of the rotor 2 can be prevented from increasing.

SECOND EMBODIMENT

Figure 5A:
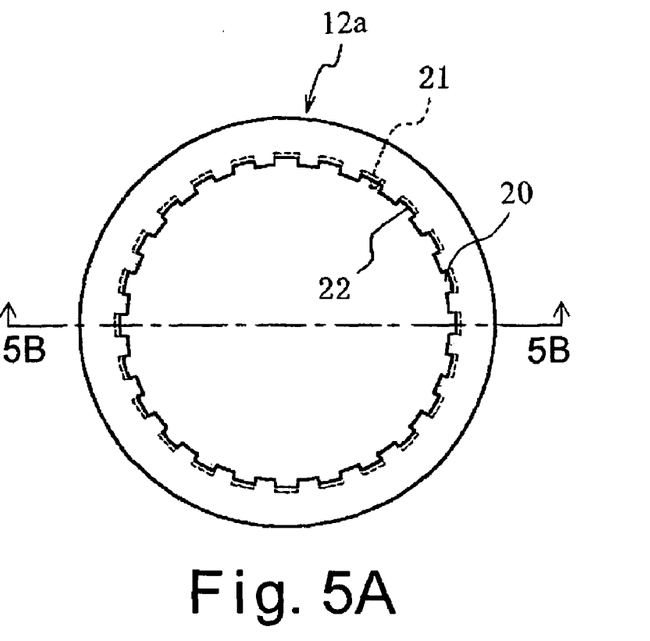
FIG. 5A is a schematic side elevational view of a rotor used in a radial gap electric motor with an electric motor structure in accordance with a second embodiment of the present invention.
Figure 5B:
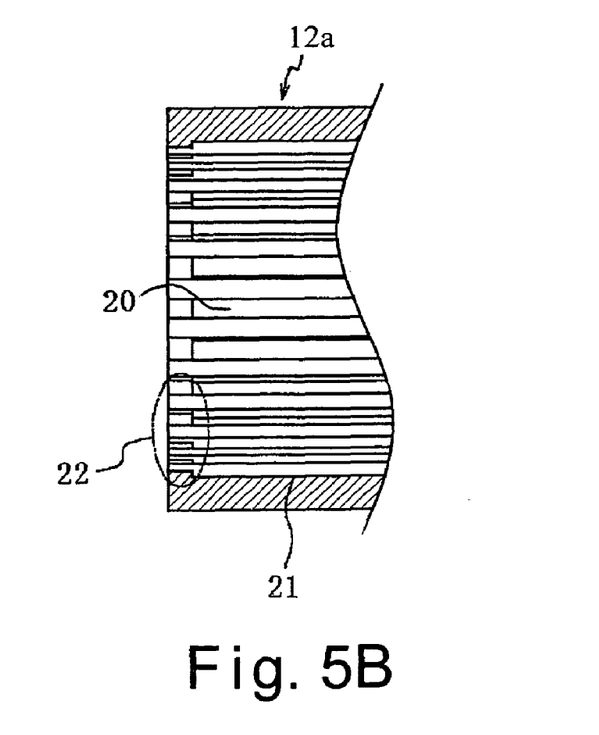
FIG. 5B is a partial cross sectional view of the rotor illustrated in FIG. 5A taken along a section line 5B—5B in FIG. 5A in accordance with the second embodiment of the present invention.

Referring now to FIGS. 5A and 5B, an electric motor structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The electric motor structure of the second embodiment is basically identical to the electric motor structure of the first embodiment as shown in Figures. 1 to 4 except for the center cylindrical member 2a of the rotor 2 of the first embodiment is substituted with a center cylindrical member 12a of the second embodiment. Since all the components of the radial gap electric motor $M_R$ except for the center cylindrical member 12a are basically the same as those shown in FIGS. 1 and 2, only the center cylindrical member 12a is described herein.

FIG. 5A is a schematic left side axial end view of the center cylindrical member 12a in accordance with the second embodiment of the present invention. The center cylindrical member 12a is configured and arranged to be integrally formed with the rotor body member 2a shown in FIGS. 1 and 2 to form a rotor that is installed in the radial gap electric motor $M_R$ shown in FIGS. 1 and 2. The axial end view shown in FIG. 5A is viewed in a direction substantially parallel to a center axis of the center cylindrical member 12a. FIG. 5B is a schematic partial cross sectional view of the center cylindrical member 12a taken along a section line 5B—5B in FIG. 5A which contains the center axis of the center cylindrical member 12a.

As seen in FIGS. 5A and 5B, in the center cylindrical member 12a of the second embodiment, a plurality of grooves 20 are formed along an radial inner surface of the center cylindrical member 12a in a direction parallel to a center axis of the center cylindrical member 12a. Moreover, a bottom surface of each of the grooves 20 forms a cooling surface 21, and each of the grooves 20 includes a pair of shallow diameter sections 22 at both axial ends thereof. Thus, the coolant is supplied to the cooling surfaces 21 of the grooves 20 formed on the radial inner peripheral surface of the center cylindrical member 12a and flows along the grooves 20 in a direction from an approximate center portion of the center cylindrical member 12a toward both axial ends portions of the center cylindrical member 12a. Since the shallow groove portions 22 are provided with the grooves 20 at both axial ends of the grooves 20, the amount of coolant that is discharged from the grooves 20 are limited or restricted. Thus, in the second embodiment of the present invention, the shallow groove portions 22 form a coolant discharge restricting section.

In order to manufacture the center cylindrical member 12a of the second embodiment, first, the grooves 20 that extend in a direction parallel to the center axis of the center cylindrical member 12a are preferably provided in the radially inward peripheral surface of a circular cylindrical member (the center cylindrical member 12a) using broaching or other manufacturing methods. The grooves 20 preferably extend over the entire axial length of the circular cylindrical member 12a. Then, bottom surfaces of the grooves 20 are machined to increase depths of the grooves 20 except for both axial end portions of the center cylindrical member 12a as shown in FIG. 5B (only the left side axial end portion is shown). Accordingly, the cooling surfaces 21 (i.e., bottom surfaces of the grooves 20) and the shallow groove sections 22 at both axial end portions of the grooves 20 are formed in the center cylindrical member 12a.

Similarly to the first embodiment, the present invention is not limited to the above described method of manufacturing the center cylindrical member 12a including the grooves 20 and the shallow groove sections 22. It will be apparent to those skilled in the art from this disclosure that any method can be utilized as long as the center cylindrical member 12a with the grooves 20, the cooling surface 21 and the shallow groove sections 22 as shown in FIGS. 5A and 5B is formed by such method.

THIRD EMBODIMENT

Figure 6A:
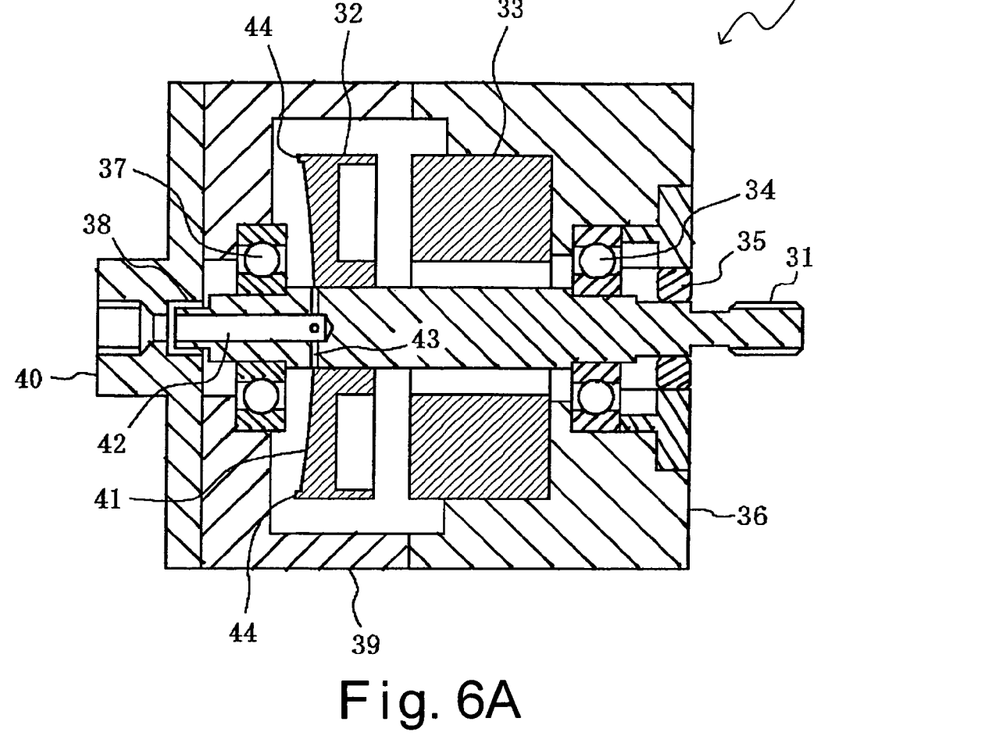
FIG. 6A is a simplified schematic partial cross sectional view of an axial gap electric motor with an electric motor structure in accordance with a third embodiment of the present invention.
Figure 6B:
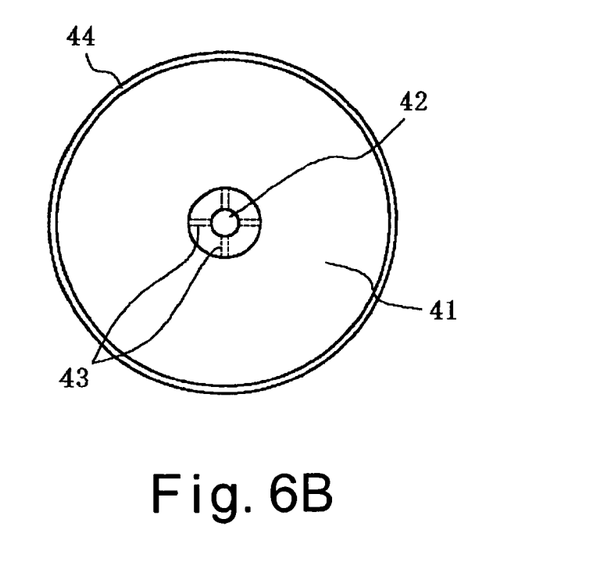
FIG. 6B is a schematic side elevational view of a rotor used in the axial gap electric motor illustrated in FIG. 6A in accordance with the third embodiment of the present invention.
Figure 7:
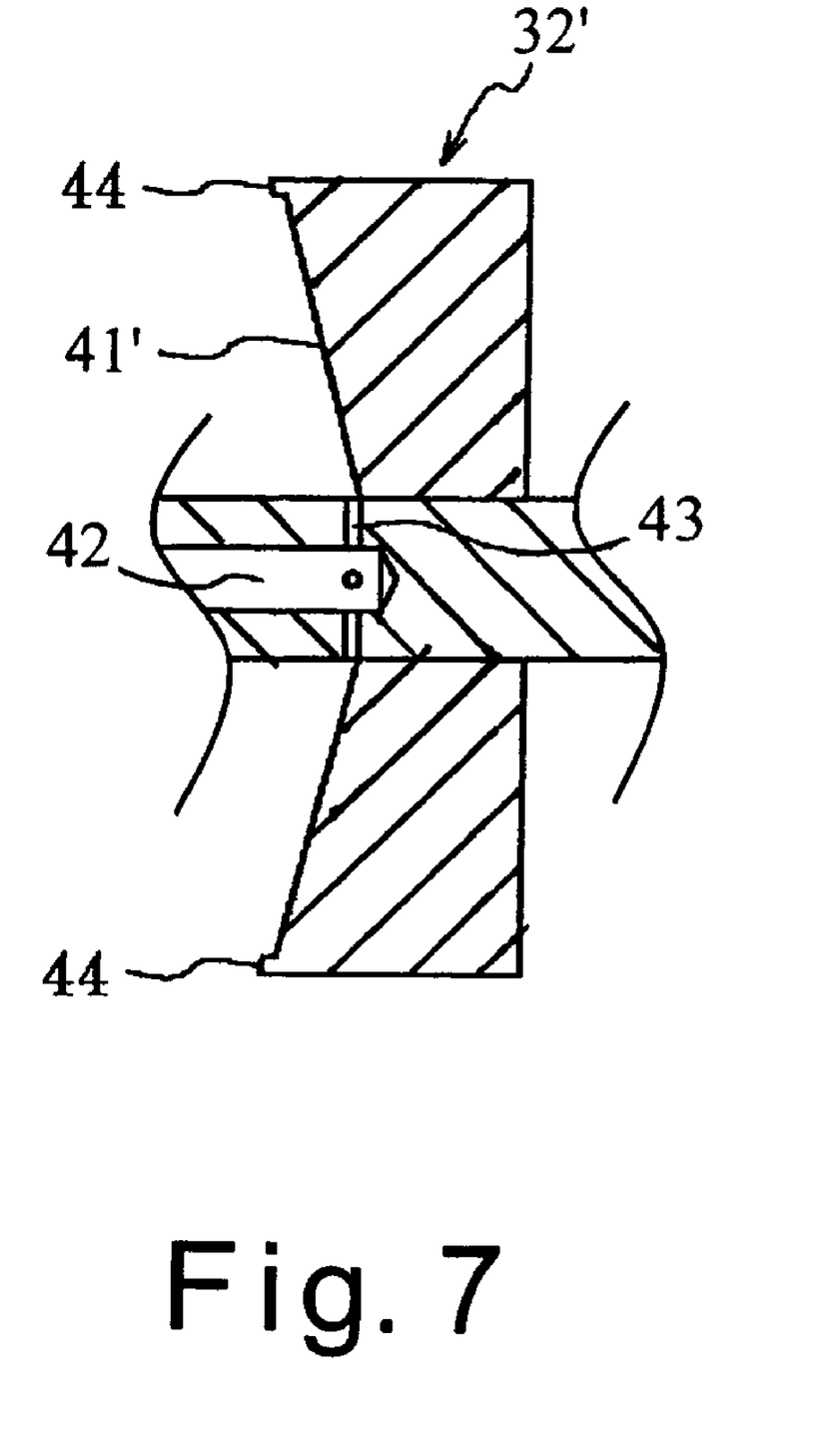
FIG. 7 is a schematic partial cross sectional view of an alternative configuration of the rotor used in the axial gap electric motor in accordance with the third embodiment of the present invention.

Referring now to FIGS. 6A, 6B and 7, an axial gap electric motor $M_A$ with a rotor cooling structure in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 6A is a simplified schematic partial cross sectional view of the axial gap electric motor $M_A$ in which the rotor cooling structure in accordance with the third embodiment of the present invention has been employed. As shown in FIG. 6A, the axial gap electric motor $M_A$ basically comprises a rotary shaft 31, a disk-shaped rotor 32 and a stator 33. The disk-shaped rotor 32 is non-rotatably coupled to the rotary shaft 31. The disk-shaped rotor 32 has a first main surface and a second main surface both extending substantially radially with respect to the rotary shaft 31. The stator 33 is configured and arranged to face the second main surface of the disk-shaped rotor 32 along a direction parallel to a center axis of the disk-shaped rotor 32 so that an axial gap is formed between the disk-shaped rotor 32 and the stator 33. Moreover, a front case 36 is coupled to an outside surface of the stator 33 that is opposite from the disk-shaped rotor 32 and configured and arranged to support a second axial end portion of the rotary shaft 31 through a bearing 34 and a seal 35. A rear case 38 is coupled to the front case 36 and configured and arranged to support a first axial end portion of the rotary shaft 31 through a bearing 37. Moreover, a cover 40 is provided near the first axial end portion of the rotary shaft 1 to seal the bearing 37 through a seal 39.

The disk-shaped rotor 32 includes a cooling surface 41 that extend substantially radially with respect to the rotary shaft 31. As seen in FIG. 6A, the cooling surface 41 is a generally concaved surface, and disposed on a first axial side of the disk-shaped rotor 32 that is opposite from the stator 33. An axial coolant passage 42 is provided in the rotary shaft 31 to supply a coolant to the cooling surface 41 of the disk-shaped rotor 32. More specifically, the axial coolant passage 42 extends along the axial center axis of the rotary shaft 31 from the first end portion of the rotary shaft 31 located near the bearing 37 to a position located slightly beyond the cooling surface 41 of the disk-shaped rotor 32 toward the first end portion of the rotary shaft 31 near the bearing 34. One or more coolant supply passages 43 are provided that communicate with the axial coolant passage 42 and open into the radially inner side of the cooling surface 41. Thus, the coolant is supplied from the axial coolant passage 42 in the rotary shaft 41 to the cooling surface 41 of the disk-shaped rotor 32 via the coolant supply passages 43. The coolant then flows from the radial inner portion of the cooling surface 41 toward the radial outer portion of the cooling surface by forming a liquid film of the coolant due to the centrifugal force of the disk-shaped rotor 32.

FIG. 6B is a schematic left side axial end view of the disk-shaped rotor 32 coupled to the rotary shaft 31. For illustration purposes, FIG. 6B also shows arrangements of the axial coolant passage 42 and the coolant supply passages 43. In the third embodiment of the present invention, the disk-shaped rotor 32 is provided with an annular protrusion 44 formed on an outer circumferential edge of the cooling surface 41 where the coolant is discharged from the cooling surface 41 as seen in FIG. 6B. Since the annular protrusion 44 is provided on the peripheral edge of the cooling surface 41 of the disk-shaped rotor 32 where the coolant is discharged, the annular protrusion 44 is configured and arranged to hold the coolant flowing as a liquid film on the cooling surface 41 like a dam. In other words, the annular protrusion 44 is configured and arranged to limit or restrict an amount of the coolant discharged from the cooling surface 44. Therefore, even when the disk-shaped rotor 32 rotates at a high speed and the centrifugal force acting on the liquid film of the coolant on the cooling surface 41 is large, a certain amount of the coolant on the cooling surface 41 is secured to maintain a thickness of the liquid film of the coolant at a desired thickness. Accordingly, a high cooling performance of the disk-shaped rotor 32 can be ensured. In the third embodiment of the present invention, the annular protrusion 44 forms a coolant discharge restricting section.

Moreover, in the axial gap electric motor $M_A$, the centrifugal force acting on the coolant on the cooling surface 41 increases as the coolant moves toward the radial outer portion of the cooling surface 41. Thus, the effect of providing the annular protrusion 44 to maintain the thickness of the liquid film of the coolant is more pronounced in the axial gap electric motor $M_A$ than in the radial gap electric motor $M_R$ shown in FIG. 1. As a result, it is not necessary to increase the amount of the coolant being supplied to the cooling surface 41 in order to secure a sufficient coolant film thickness, and thus, increases in the mechanical power loss of the disk-shaped rotor 32 can be avoided.

Figure 6C:
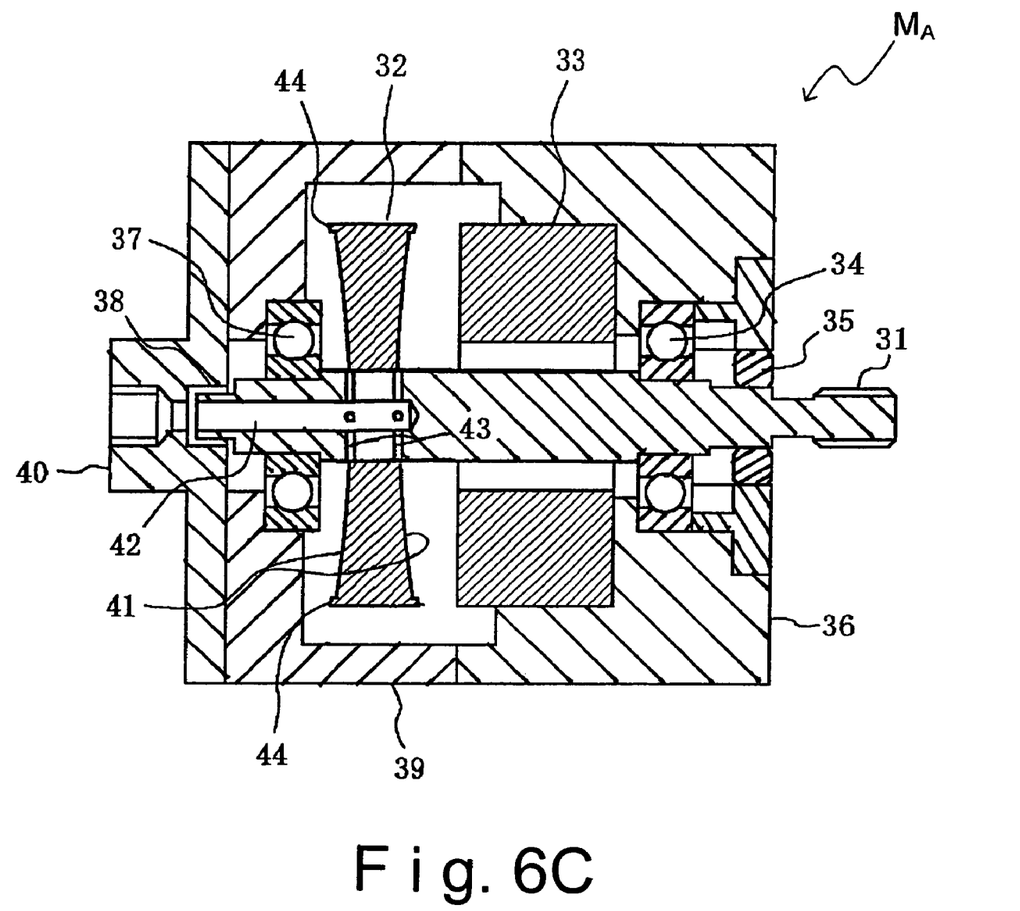
FIG. 6C is a simplified schematic partial cross sectional view of an axial gap electric motor with a modified electric motor structure in accordance with the third embodiment of the present invention.

Although in the third embodiment, the cooling surface 41 is provided on the first surface of the disk-shaped rotor 32 that is opposite from the stator 33, it is also acceptable to provide the cooling surface 41 on the second surface of the disk-shaped rotor 32 that faces the stator 33 or on both of the first and second surfaces of the disk-shaped rotor 32 as seen in FIG. 6C.

The cooling surface 41 of the disk-shaped rotor 32 can be fabricated using any conventional machining process. Moreover, although the cooling surface 41 is illustrated in FIG. 6A as a curved or concaved surface, the shape of the cooling surface 41 is not limited to the curved or concaved surface as shown in FIG. 6A. For example, FIG. 7 is a diagrammatic cross sectional view of a disk-shaped rotor 32' with the cooling structure in accordance with an alternative structure of the third embodiment of the present invention. As seen in FIG. 7, the cooling surface 41' can be tapered instead of curved as in the cooling surface 41 shown in FIGS. 6A and 6B. The same operational effects as the disk-shaped rotor 32 illustrated in FIGS. 6A and 6B are achieved with the disk-rotor 32' as shown in FIG. 7.

FOURTH EMBODIMENT

Figure 8A:
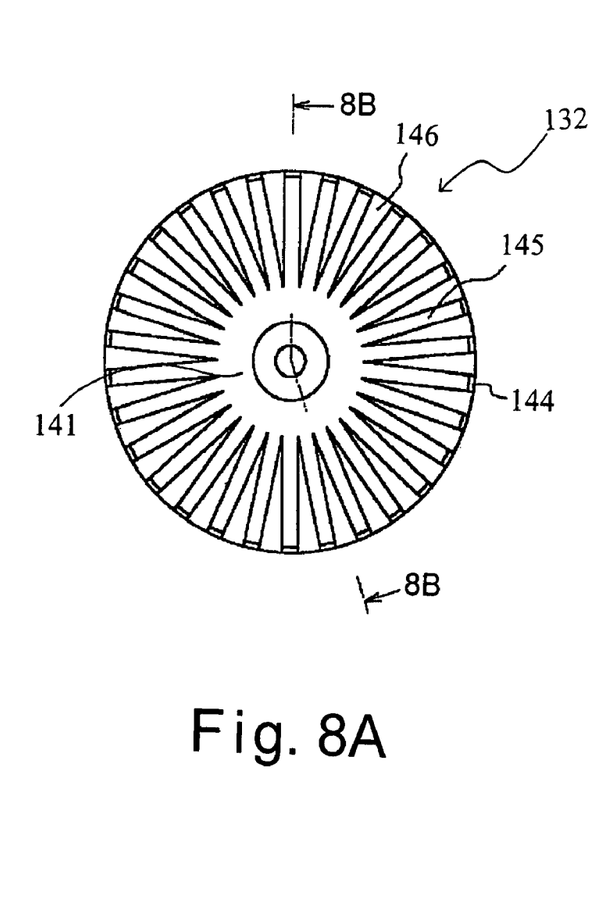
FIG. 8A is a schematic side elevational view of a rotor used in an axial gap electric motor with an electric motor structure in accordance with a fourth embodiment of the present invention.
Figure 8B:
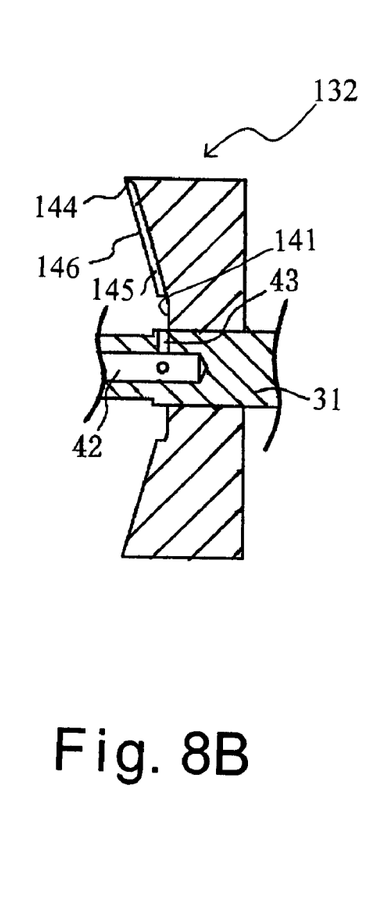
FIG. 8B is a partial schematic cross sectional view of the rotor illustrated in FIG. 8A in accordance with the fourth embodiment of the present invention.
Figure 8C:
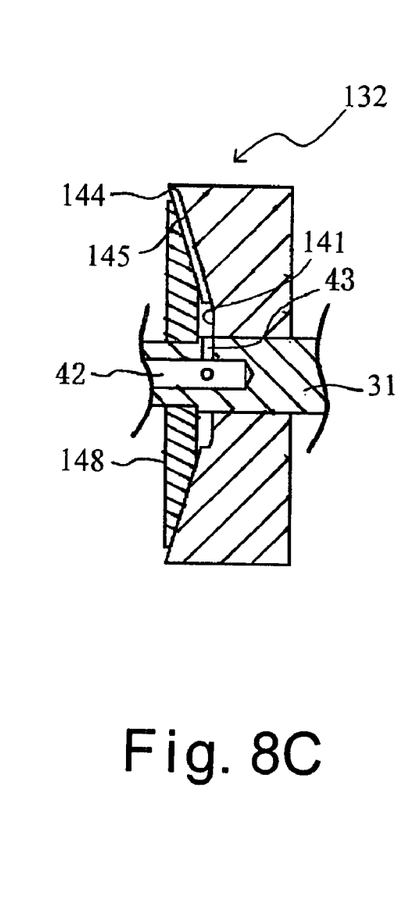
FIG. 8C is a partial schematic cross sectional view of the rotor illustrated in FIGS. 8A and 8B coupled with a circular disc in accordance with the fourth embodiment of the present invention.

Referring now to FIGS. 8A to 8C, an electric motor structure used in an axial gap electric motor in accordance with a fourth embodiment will now be explained. In view of the similarity between the third and fourth embodiments, the parts of the fourth embodiment that are identical to the parts of the third embodiment will be given the same reference numerals as the parts of the third embodiment. Moreover, the descriptions of the parts of the fourth embodiment that are identical to the parts of the third embodiment may be omitted for the sake of brevity.

The electric motor structure of the fourth embodiment is basically identical to the electric motor structure of the third embodiment except that a disk-shaped rotor 132 is substituted for the disk-shaped rotor 32 of the third embodiment. In other words, the disk-shaped rotor 132 is configured and arranged to be installed in the axial gap electric motor $M_A$ as shown in FIG. 6A in the same manner as the disk-shaped rotor 32. More specifically, the disk-shaped rotor 132 of the fourth embodiment defers from the disk- shaped rotor 32 of the third embodiment in that a cooling surface 141 of the disk-shaped rotor 132 is provided with a plurality of generally fan-shaped ridges 146 so that a plurality of grooves 145 that extend radially on the cooling surface 141 of the disk-shaped rotor 132.

FIG. 8A is an axial end view of the disk-shaped rotor 132 that is viewed from a direction parallel to a center axis of the disk-shaped rotor 132. FIG. 8B is a schematic cross sectional view of the disk-shaped rotor 132 taken along a section line 8B-8B of FIG. 8A and viewed in the direction of the arrows in FIG. 8A.

As shown in FIGS. 8A and 8B, the cooling surface 141 of the disk-shaped rotor 132 includes the ridges 146 so that the grooves 145 extend in the radial direction of the disk-shaped rotor 132. Moreover, the ridges 146 are arranged such that two adjacent grooves 145 are separated by the ridge 146 as seen in FIGS. 8A and 8B. Furthermore, each of the grooves 145 is configured and arranged to include a shallow groove section 144 located at the radially outermost end of the groove 145. In the fourth embodiment of the present invention, the shallow groove sections 144 form a coolant discharge restricting section.

Accordingly, with the fourth embodiment of the present invention, the same operational effects as the third embodiment can be obtained. Moreover, the ridges 146 between the grooves 145 serve as fins that increase a heat radiating surface area of the disk-shaped rotor 132 and enable a high cooling performance to be obtained even when the disk-shaped rotor 132 is stopped or rotating at an extremely low speed.

Furthermore, the disk-shaped rotor 132 can also be further provided with a circular disk member 148 as shown in FIG. 8C. The circular disk member 148 is configured and arranged to coaxially fit onto the rotary shaft 31 to cover the ridges 146 and the grooves 145.

As described previously, the centrifugal force acting on the coolant flowing over the cooling surface 141 of the disk-shaped rotor 132 increases as the coolant moves farther outward in the radial direction. Consequently, the coolant may separates from the cooling surface 141 of the disk-shaped rotor 132 in a region where gravity is greater than the centrifugal force acting on the coolant (said region is determined based on the angular velocity and radial position of the disk-shaped rotor 132).

By providing the circular disk member 148 such that a gap exist between the circular disk member 148 and the cooling surface 141 at the center portion of the cooling surface 141 and along the grooves 145 as shown in FIG. 8C, the coolant is guided by the circular disk member 148 until it reaches a radial position where the centrifugal force acting on the refrigerant is larger than the force of gravity. Therefore, the problem of the coolant separating from the cooling surface 141 can be prevented.

Accordingly, with the electric motor structure of the fourth embodiment, since the grooves 145 provided in the cooling surface 141 and extending in the direction in which the coolant flows are configured such that the depth of the grooves 145 becomes shallower at an end of the grooves where the coolant is discharged, the shallow groove sections 144 of the grooves 145 function to hold the coolant flowing as a liquid film on the cooling surface 141 like a dam. Therefore, the shallow groove sections 144 are configure and arranged to limit or restrict the amount of the coolant discharged from the cooling surface 141. Even when the disk-shaped rotor 132 rotates at a high speed and the centrifugal force acting on the liquid film of the coolant on the cooling surface 141 is large, the amount of the coolant on the cooling surface 141 is secured and the thickness of the liquid film is held at a desired thickness. Therefore, a high cooling performance of the disk-shaped rotor 132 can be ensured. As a result, it is not necessary to increase the amount of coolant being supplied to the cooling surface 141 in order to secure a sufficient coolant film thickness during high rotational speeds, and increases in the mechanical power loss of the rotor can be avoided. Moreover, the ridges 146 between grooves 145 serve as fins that increase the heat radiating surface area of the disk-shaped rotor 132. Therefore, a high cooling performance can be further promoted even when the disk-shaped rotor 132 is stopped or rotating at an extremely low speed.

In all of the first to fourth embodiments described above, the coolant is preferably an oil. When oil is used as the coolant, the coolant can also serve as a lubricant for the shaft bearings. Thus, both the overall size and the cost of the electric motor (i.e., the radial gap electric motor $M_R$ and the axial gap electric motor $M_A$) can be reduced.

Accordingly, the electric motor structure with the rotor cooling structure in accordance with the present invention is well-suited for use in both radial gap electric motor $M_R$ and the axial gap electric motor $M_A$ intended for high-capacity vehicle applications. With the present invention, a high level of cooling performance can be obtained even at high rotational speeds.

Figure 9:
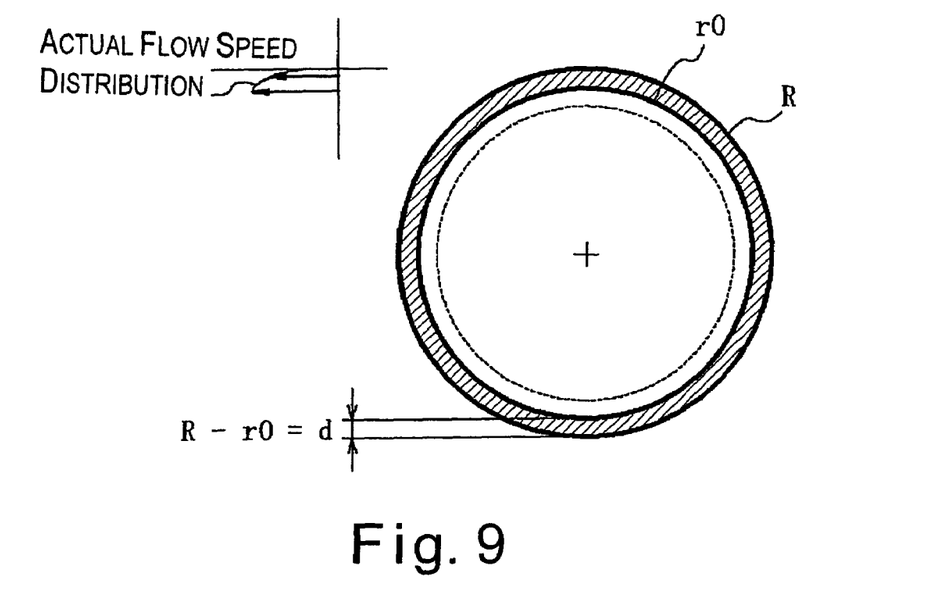
FIG. 9 is a diagrammatic cross sectional view of a rotating pipe (e.g., a rotor of a radial gap electric motor) for illustrating an equivalent diameter of a liquid film flowing through the pipe.
Figure 10:
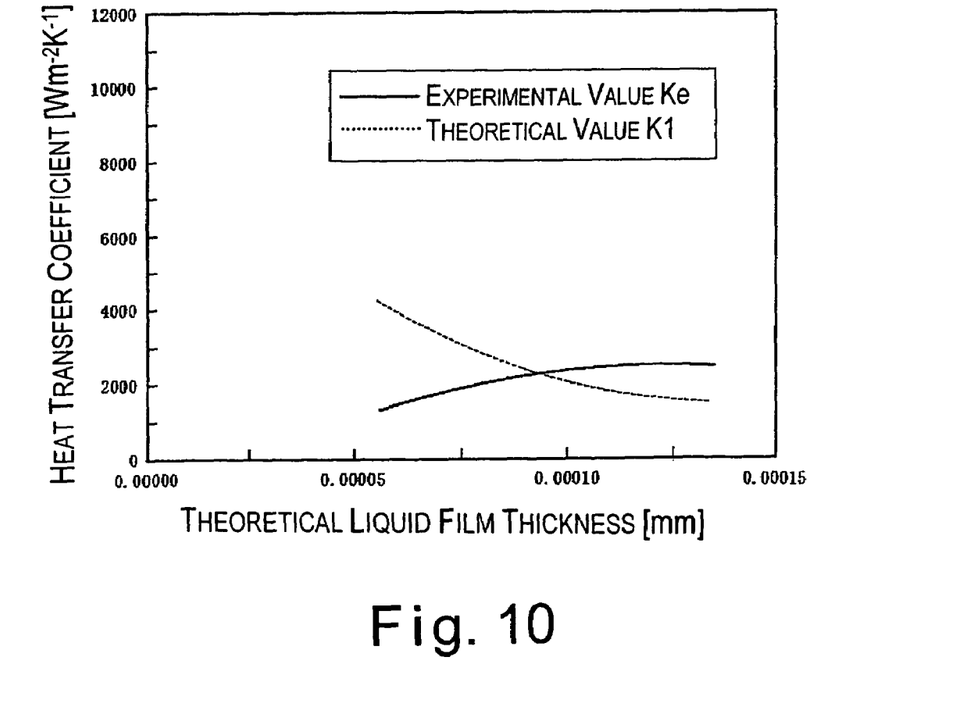
FIG. 10 is a plot of a theoretical value and an experimental value of a heat transfer coefficient versus a theoretical liquid film thickness when a rotational speed of the rotor is 5000 rpm.
Figure 11:
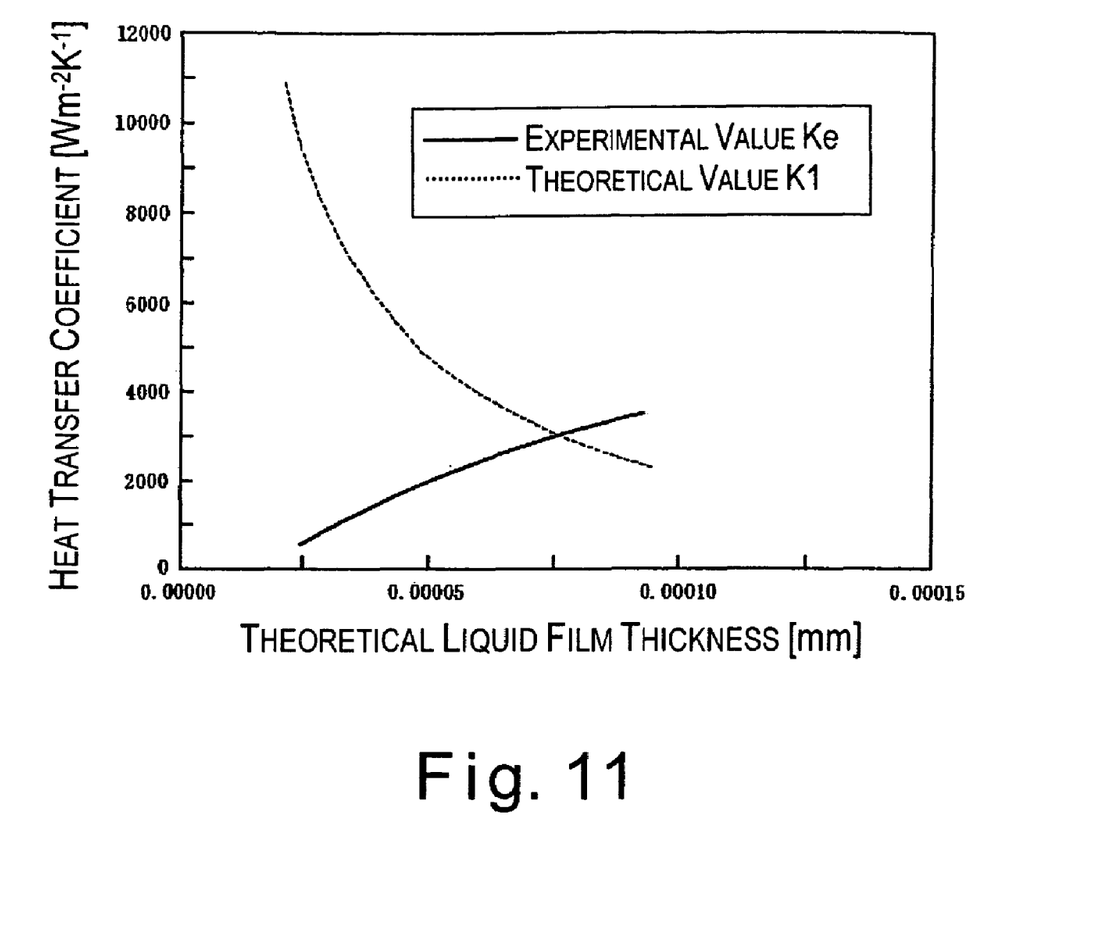
FIG. 11 is a plot of the theoretical value and the experimental value of the heat transfer coefficient versus the theoretical liquid film thickness when the rotational speed of the rotor is 10,000 rpm.

Referring now to FIGS. 9 to 11, a general mechanism by which the cooling performance declines when the thickness of the liquid film becomes small will now be described. Generally speaking, a theoretical film thickness d (m) of a liquid film flowing through a rotating circular pipe (e.g., a rotor) is expressed according to Equation 1 below based on a flow speed u (m/s) of the liquid, an angular velocity ω (radians/s) of the rotor, and a flow rate q (L/min) of the liquid.

$$d = R - r_0 = \sqrt[3]{\frac{\mu q}{\pi \rho \omega^2 R^2}} \rightarrow u = \frac{q}{\pi(R^2 - r_0^2)} \quad \text{Equation 1}$$

The Reynolds number can then be found using Equation 2 based on the flow speed u (m/s), a density ρ (kg/cm3), a viscosity coefficient μ (Pa/s) and the equivalent diameter De (4×cross sectional area of flow passage×wet surface length).

$$R_e = \frac{\rho u D_e}{\mu} \quad \text{Equation 2}$$

More specifically, the equivalent diameter De is given by Equation 3. The liquid film flows in an area indicated with cross hatching in the cross sectional view of the rotating pipe shown in FIG. 9. A shape of the flow passageway has a donut shape with an external diameter of R and an internal diameter of R−2d.

$$D_e = \frac{4\pi[R^2 - (R-2d)^2]}{2\pi[R + (R-2d)]} \quad \text{Equation 3}$$

Generally, the flow of the liquid film is assumed to be laminar if the Reynolds number Re found in this manner is less than 2300 and turbulent if the Reynolds number Re is greater than 2300.

Next, the Nusselt number Nu is found. The Nusselt number is determined uniquely if the flow of the liquid film is laminar. The Nusselt number is found using an appropriate calculating formula (omitted here) if the flow of the liquid film is turbulent.

The heat transfer coefficient K (W/m2/K) of the coolant can then be found by substituting the Nusselt number Nu, the aforementioned equivalent diameter De, and a thermal conductivity rate κ (W/m/K) of the coolant into Equation 4.

$$N_u = \frac{K D_e}{\kappa} \quad \text{Equation 4}$$

FIGS. 10 and 11 show a plot of a theoretical value K1 and an experimental value Ke of the heat transfer coefficient K calculated as just described versus the theoretical liquid film thickness d. FIG. 10 illustrates a case in which the rotational speed of the rotor is 5000 rpm and FIG. 11 illustrates a case in which the rotational speed of the rotor is 10,000 rpm.

As shown in FIGS. 10 and 11, the theoretical heat transfer coefficient K1 increases as the liquid film thickness d decreases but the experimental value Ke decreases as the film thickness d decreases. Thus, when the liquid film thickness d decreases, the heat transfer coefficient decreases and the cooling performance declines. This trend becomes more remarkable as the rotational speed increases as seen in FIG. 11.

As used herein, the following directional terms "forward, rearward, above, downward, vertical, horizontal, below and transverse" as well as any other similar directional terms refer to those directions of an electric motor equipped with the present invention. Accordingly, these terms, as utilized to describe the present invention should be interpreted relative to an electric motor equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-3789. The entire disclosure of Japanese Patent Application No. 2004-3789 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An electric motor structure comprising:
   a rotary shaft having a coolant passageway therein;
   a rotor coupled to the rotary shaft, and having a cooling surface configured and arranged to receive a coolant supplied from the coolant passageway of the rotary shaft such that the coolant flows along the cooling surface to a discharge outlet formed at an end of the rotor; and
   a coolant discharge restricting section formed on the cooling surface of the rotor at a location remote from the coolant passageway of the rotary shaft to restrict discharge of the coolant from the cooling surface of the rotor with the coolant discharge restricting section forming a part of the discharge outlet such that coolant flows over the coolant discharge restricting section to a space disposed exteriorly of the rotary shaft at the end of the rotor.

2. The electric motor structure as recited in claim 1, wherein
   the coolant discharge restricting section protrudes from the cooling surface of the rotor in a direction substantially perpendicular to the cooling surface at a portion where the coolant flowing along the cooling surface is discharged from the cooling surface.

3. The electric motor structure as recited in claim 1, wherein
   the rotor is a generally cylindrical member that is coaxially coupled to the rotary shaft with the cooling surface being formed on an inner peripheral wall of the rotor that faces the rotary shaft.

4. The electric motor structure as recited in claim 3, wherein
   the coolant discharge restricting section is configured and arranged such that an internal diameter of the cooling surface is reduced where the coolant flowing along the cooling surface is discharged from the cooling surface.

5. An electric motor structure comprising:
   a rotary shaft having a coolant passageway therein;
   a rotor coupled to the rotary shaft, and having a cooling surface configured and arranged to receive a coolant supplied from the coolant passageway of the rotary shaft such that the coolant flows along the cooling surface; and
   a coolant discharge restricting section formed on the cooling surface of the rotor, the coolant discharge restricting section being configured and arranged to restrict discharge of the coolant from the cooling surface,
   the rotor being a generally cylindrical member that is coaxially coupled to the rotary shaft with the cooling surface being formed on an inner peripheral wall of the rotor that faces the rotary shaft,
   the coolant discharge restricting section including a pair of annular flanges disposed on axial ends of the cooling surface such that the annular flanges extend radially towards the rotary shaft to form a pair of discharge outlets therebetween.

6. The electric motor structure as recited in claim 3, wherein
   the rotor is disposed with respect to the rotary shaft such that an interstitial coolant passage that communicates with the coolant passageway of the rotary shaft is formed between the coolant surface of the rotor and an outer peripheral surface of the rotary shaft.

7. The electric motor structure as recited in claim 3, wherein
   the coolant discharge restricting section and the rotor are separate members that are integrally coupled together.

8. The electric motor structure as recited in claim 3, wherein
   the coolant discharge restricting section and the rotor are formed as a unitary, one-piece member.

9. The electric motor structure as recited in claim 3, wherein
   the cooling surface of the rotor includes a plurality of grooves extending in an axial direction of the rotor on the inner peripheral wall of the rotor.

10. The electric motor structure as recited in claim 9, wherein
    the coolant discharge restricting section is formed at both axial end portions of the grooves to protrude from the rotor towards the rotary shaft so that the grooves are shallower at the axial end portions of the grooves.

11. The electric motor structure as recited in claim 1, wherein
    the rotor is a generally disk shape member with the cooling surface being formed on a first main surface of the rotor that extends substantially radially with respect to the rotary shaft.

12. The electric motor structure as recited in claim 11, wherein
    the coolant discharge restricting section is formed such that a distance between a second main surface and the first main surface of the rotor increases where the coolant flowing along the cooling surface is discharged from the cooling surface.

13. The electric motor structure as recited in claim 11, wherein
    the coolant discharge restricting section is formed as an annular flange extending from an outer peripheral area of the cooling surface in a direction substantially parallel to a center rotational axis of the rotary shaft.

14. The electric motor structure as recited in claim 11, wherein
    the cooling surface includes a plurality of grooves extending in a radial direction with respect to the rotary shaft so that the coolant flows along the grooves from a radial inner portion toward a radial outer portion of the rotor.

15. The electric motor structure as recited in claim 14, wherein the coolant discharge restricting section is formed such that the grooves are shallower where the coolant flowing on the cooling surface along the grooves is discharged from the cooling surface.

16. The electric motor structure as recited in claim 14, further comprising
a circular disk member coaxially coupled to the first main surface of the rotor so that a gap is formed between the cooling surface and the circular disk member.

17. The electric motor structure as recited in claim 1, wherein
the cooling surface includes a plurality of grooves extending in a direction of a coolant flow, and
the coolant discharge restricting section is formed such that the grooves are shallower where the coolant flowing on the cooling surface along the grooves is discharged from the cooling surface.

18. The electric motor structure as recited in claim 17, wherein
the grooves extend in an axial direction of the rotor relative to a rotational axis of the rotary shaft.

19. The electric motor structure as recited in claim 17, wherein the grooves extend in a radial direction of the rotor relative to a rotational axis of the rotary shaft.

20. The electric motor structure as recited in claim 1, wherein
the coolant is an oil.

21. An electric motor structure comprising:
means for forming a rotor with a rotational axis;
means for supplying a coolant along the rotational axis of the rotor to a cooling surface of the rotor such that the coolant flows along the cooling surface to a discharge outlet formed at an end of the rotor; and
means for restricting discharge of the coolant from the cooling surface of the rotor and for forming a part of the discharge outlet such that coolant flows over the coolant discharge restricting section to a space disposed exteriorly of the rotary shaft at the end of the rotor.

22. The electric motor structure as recited in claim 1, wherein the coolant discharge restricting section is disposed at the end of the rotor such that that coolant flowing over the coolant discharge restricting section is directly discharged to the space disposed exteriorly of the rotary shaft.

* * * * *